US011987370B2

(12) United States Patent
Geliot

(10) Patent No.: US 11,987,370 B2
(45) Date of Patent: May 21, 2024

(54) AIRCRAFT PROPULSION ASSEMBLY COMPRISING A FRONT ENGINE MOUNT WHICH COMPRISES A TRANSVERSE BEAM WHICH IS PARTIALLY POSITIONED OPPOSITE A FRONT TRANSVERSE REINFORCEMENT OF A PRIMARY STRUCTURE OF A STRUT

(71) Applicant: Airbus Operations SAS, Toulouse (FR)

(72) Inventor: Jean Geliot, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/849,882

(22) Filed: Jun. 27, 2022

(65) Prior Publication Data

US 2022/0411086 A1 Dec. 29, 2022

(30) Foreign Application Priority Data

Jun. 29, 2021 (FR) ........................... 2106985

(51) Int. Cl.
*B64D 27/40* (2024.01)
*B64D 27/02* (2006.01)
*F02C 7/20* (2006.01)

(52) U.S. Cl.
CPC ............ *B64D 27/40* (2024.01); *B64D 27/02* (2013.01); *F02C 7/20* (2013.01); *B64D 27/402* (2024.01)

(58) Field of Classification Search
CPC ........ B64D 2027/262; B64D 2027/264; B64D 2027/266; B64D 2027/268;

(Continued)

(56) References Cited

U.S. PATENT DOCUMENTS

| 9,248,921 B2 * | 2/2016 | West ..................... B64D 27/18 |
| 2008/0216483 A1 * | 9/2008 | Diochon ................ B64D 27/26 244/54 |

(Continued)

FOREIGN PATENT DOCUMENTS

| FR | 2916424 A1 | 11/2008 |
| FR | 3100226 A1 | 3/2021 |
| WO | WO-2018233860 A1 * | 12/2018 ............. B64D 27/26 |

OTHER PUBLICATIONS

French Search Report; priority document.

*Primary Examiner* — Todd E Manahan
*Assistant Examiner* — Marc J Amar
(74) *Attorney, Agent, or Firm* — Greer, Burns & Crain, Ltd.

(57) ABSTRACT

An aircraft propulsion assembly including a front engine mount including a transverse beam which is connected to the engine via first and second convergent connection rods. This transverse beam includes an upper extension which is at least partially positioned opposite a front transverse reinforcement of the primary structure and which is connected thereto via at least one first connection element and right and left lateral extensions which are positioned at one side and another of the upper extension, each of them being connected via a least one second fixing element to a first wing of a right or left bracket, a second wing of the right or left bracket being connected via at least one third connection element to the primary structure.

9 Claims, 3 Drawing Sheets

(58) Field of Classification Search
CPC .. B64D 27/16–20; B64D 27/26; B64D 27/40; B64D 27/402; B64D 27/404; B64D 27/406
See application file for complete search history.

(56) References Cited

U.S. PATENT DOCUMENTS

| | | | |
|---|---|---|---|
| 2008/0223983 A1* | 9/2008 | Lafont | B64D 27/26 244/54 |
| 2008/0272229 A1* | 11/2008 | Lafont | B64D 27/26 244/54 |
| 2009/0212155 A1* | 8/2009 | Huggins | B64D 27/26 244/54 |
| 2010/0133376 A1 | 6/2010 | Foyer et al. | |
| 2012/0080554 A1* | 4/2012 | Lafont | B64D 27/18 244/54 |
| 2014/0033729 A1* | 2/2014 | Chouard | F02C 7/20 60/797 |
| 2018/0155041 A1* | 6/2018 | Tesniere | F01D 25/28 |
| 2018/0186462 A1* | 7/2018 | Brochard | B64D 27/26 |
| 2019/0241272 A1* | 8/2019 | Geliot | F16C 11/045 |
| 2020/0207481 A1* | 7/2020 | Combes | B64D 27/26 |
| 2020/0216184 A1* | 7/2020 | Puech | B64D 27/26 |

\* cited by examiner

AIRCRAFT PROPULSION ASSEMBLY COMPRISING A FRONT ENGINE MOUNT WHICH COMPRISES A TRANSVERSE BEAM WHICH IS PARTIALLY POSITIONED OPPOSITE A FRONT TRANSVERSE REINFORCEMENT OF A PRIMARY STRUCTURE OF A STRUT

CROSS-REFERENCES TO RELATED APPLICATIONS

This application claims the benefit of the French patent application No. 2106985 filed on Jun. 29, 2021, the entire disclosures of which are incorporated herein by way of reference.

FIELD OF THE INVENTION

The present application relates to an aircraft propulsion assembly comprising a front engine mount which comprises a transverse beam which is partially positioned opposite a front transverse reinforcement of a primary structure of a strut.

BACKGROUND OF THE INVENTION

According to one embodiment which can be seen in FIGS. 1 and 2, an aircraft 10 comprises several propulsion assemblies 12 which are positioned below each of the wings 14 of the aircraft. Each propulsion assembly 12 comprises an engine 16, a nacelle (not illustrated in FIG. 2) which is positioned around the engine 16 and a strut 18 which connects the engine 16 and the wing 14. The strut 18 comprises a primary structure 20 which is connected to the engine 16 by means of an engine mount 22 and to the wing 14 by means of a wing unit mount 24.

For the present document, a longitudinal direction X is parallel with the rotation axis A16 of the engine 16, a horizontal transverse direction Y is horizontal and perpendicular to the rotation axis A16 of the engine 16, a vertical transverse direction Z is vertical and perpendicular to the rotation axis A16 of the engine 16. A transverse plane is perpendicular to the longitudinal direction X. A longitudinal center plane is a vertical plane which extends through the rotation axis A16 of the engine 16. The notions of front and rear refer to the flow direction of the gases, the term "front" corresponding to the inlet of the gases (air) into the engine and the term "rear" corresponding to the exhaust of the gases (combustion gas).

The engine mount 22 comprises a front engine mount 26, a rear engine mount 28 and a pair of thrust rods 30 which ensure that the thrust forces are absorbed.

There is known from the document FR-3.100.226 a rear engine mount which has a small transverse spatial requirement and from the document FR-2.916.424 an aircraft engine attachment strut comprising an angled wedge for fixing a front engine mount.

According to a configuration which can be seen in FIG. 3, the primary structure 20 comprises upper and lower side members 20.1, right and left lateral panels 20.2 and a plurality of transverse reinforcements which connect the upper and lower side members 20.1 in the same manner as the left and right lateral panels 20.2. A front transverse reinforcement 20.3 is positioned in front of the primary structure 20.

According to an embodiment which can be seen in FIGS. 3 and 4, the front engine mount 26 comprises:

a transverse beam 32 which is positioned below the primary structure 20, in a state perpendicular to the front transverse reinforcement 20.3, and which is connected to the primary structure 20 via vertical connection elements 34 and to the engine 16 via a safety connection axle 36, a first connection rod 38 which is connected to the engine 16 via a first engine connection axle 40 and to the transverse beam 32 via a first beam connection axle 42, a second connection rod 44 which is connected to the engine 16 via a second engine connection axle 46 and to the transverse beam 32 via a second beam connection axle 48.

For each beam connection axle 42, 48, the transverse beam 32 comprises a cover which has two wings 32.1, 32.2, which can be seen in FIG. 4 and between which the first or second connection rod 38, 44 is positioned.

According to a configuration, the first and second connection rods 38, 44 are orientated so as to converge toward a point which is positioned below the transverse beam 32.

According to this embodiment, the transverse beam 32 comprises an upper face F32 which is pressed against the lower side member 20.1 of the primary structure 20 or against a wedge which is itself pressed against the lower side member 20.1 of the primary structure 20.

In order to improve the absorption of forces, as illustrated in FIG. 3, the front engine mount 26 comprises two brackets 50 which are positioned at one side and the other of the primary structure 20 and which each have a first wing 50.1, which is approximately horizontal and which is pressed against the upper face F32 of the transverse beam 32 and which is connected thereto by means of vertical connection elements 52.1 and a second wing 50.2 which is pressed against one of the left and right lateral panels 20.2 of the primary structure 20 and which is connected thereto by connection elements 52.2.

According to this embodiment, the entire transverse beam 32 is offset in a downward direction relative to the primary structure 20 of the strut, which involves a relatively large spatial requirement in the vertical transverse direction Z.

The present invention is intended to partially or completely overcome of the disadvantages of the prior art.

SUMMARY OF THE INVENTION

To this end, the invention relates to an aircraft propulsion assembly comprising an engine, a primary structure of a strut and a front engine mount which connects the primary structure and the engine; the primary structure comprising upper and lower side members, right and left lateral panels and a front transverse reinforcement, the upper and lower side members and the right and left lateral panels comprising front transverse edges; the front engine mount comprising:

a transverse beam which is connected to the primary structure, a first connection rod which is connected to the engine by means of at least one first engine connection axle and to the transverse beam by means of at least one first beam connection axle, a second connection rod which is connected to the engine by means of at least one second engine connection axle and to the transverse beam by means of at least one second beam connection axle, the first and second connection rods converging in the direction of a location which is positioned below the transverse beam, right and left brackets which are positioned at one side and the other of the primary structure and which each have a first wing which is connected to the transverse beam and a second wing which is connected to the primary structure.

According to the invention, the transverse beam comprises an upper extension which is at least partially positioned opposite the front transverse reinforcement, at least one first connection element which connects the upper extension and the front transverse reinforcement, right and left lateral extensions which are positioned approximately in a transverse plane at one side and the other of the upper extension and, for each right or left lateral extension, at least one second fixing element which connects the right or left lateral extension and the first wing of the right or left bracket which is positioned approximately in a transverse plane.

The fact that the transverse beam is partially positioned opposite the front transverse reinforcement of the primary structure enables the spatial requirement of the front engine mount to be reduced in the vertical transverse direction.

According to another feature, the front engine mount comprises a plurality of first connection elements which are positioned in a symmetrical manner with respect to a longitudinal center plane.

According to another feature, each first connection element comprises a rod which has an approximately horizontal axis.

According to another feature, the upper extension has an upper edge which is positioned approximately at the same level as the front transverse edge of the upper side member of the primary structure.

According to another feature, the upper extension and the right and left lateral extensions have aligned upper edges.

According to another feature, the upper extension and the right and left lateral extensions have coplanar abutment faces.

According to another feature, the first wing of each right or left bracket has a height which is substantially equal to that of the right or left lateral extension to which it is connected. In addition, the front engine mount comprises a plurality of second connection elements which are distributed over the height of the first wing of each right or left bracket.

According to another feature, the second wing of each right or left bracket has a height which is substantially equal to that of a portion of the primary structure in the region of which the right or left bracket is positioned. In addition, the front engine mount comprises a plurality of third connection elements which are distributed over the height of the second wing of each right or left bracket.

The invention also relates to an aircraft which comprises at least one propulsion assembly according to one of the preceding features.

BRIEF DESCRIPTION OF THE DRAWINGS

Other features and advantages will be appreciated from the following description of the invention, which is given purely by way of example with reference to the appended drawings, in which.

DETAILED DESCRIPTION OF THE PREFERRED EMBODIMENTS

FIGS. 5 to 10 illustrate a front engine mount 60 of a propulsion assembly which connects a primary structure 62 of an aircraft strut and an engine 64. In these different Figures, only a portion of the housing of the engine 64 and the front portion of the primary structure 62 are illustrated. At least one propulsion assembly of an aircraft is provided with such a front engine mount 60.

Figure 1:
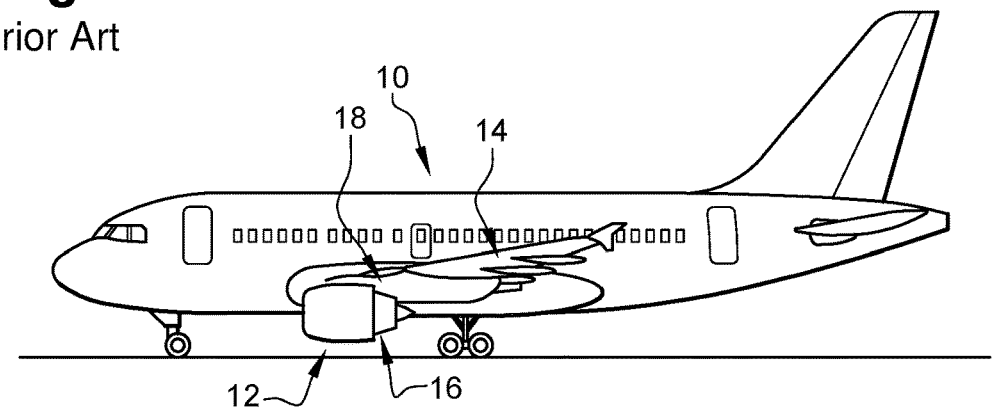
FIG. 1 shows a lateral view of an aircraft.
Figure 2:
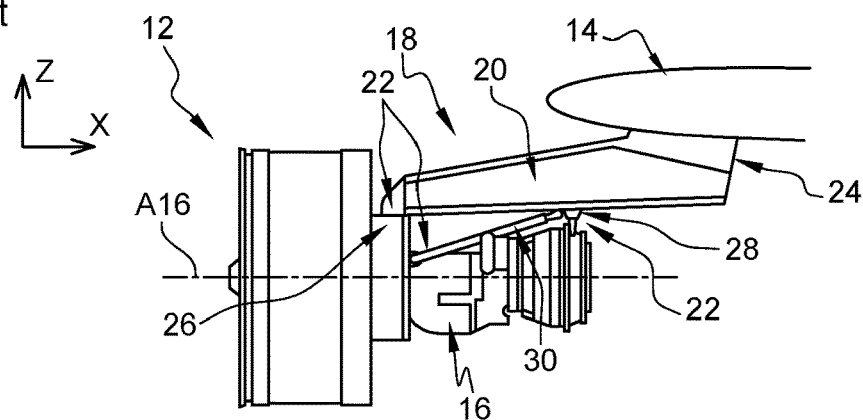
FIG. 2 shows a lateral view of a propulsion assembly without any nacelle.
Figure 3:
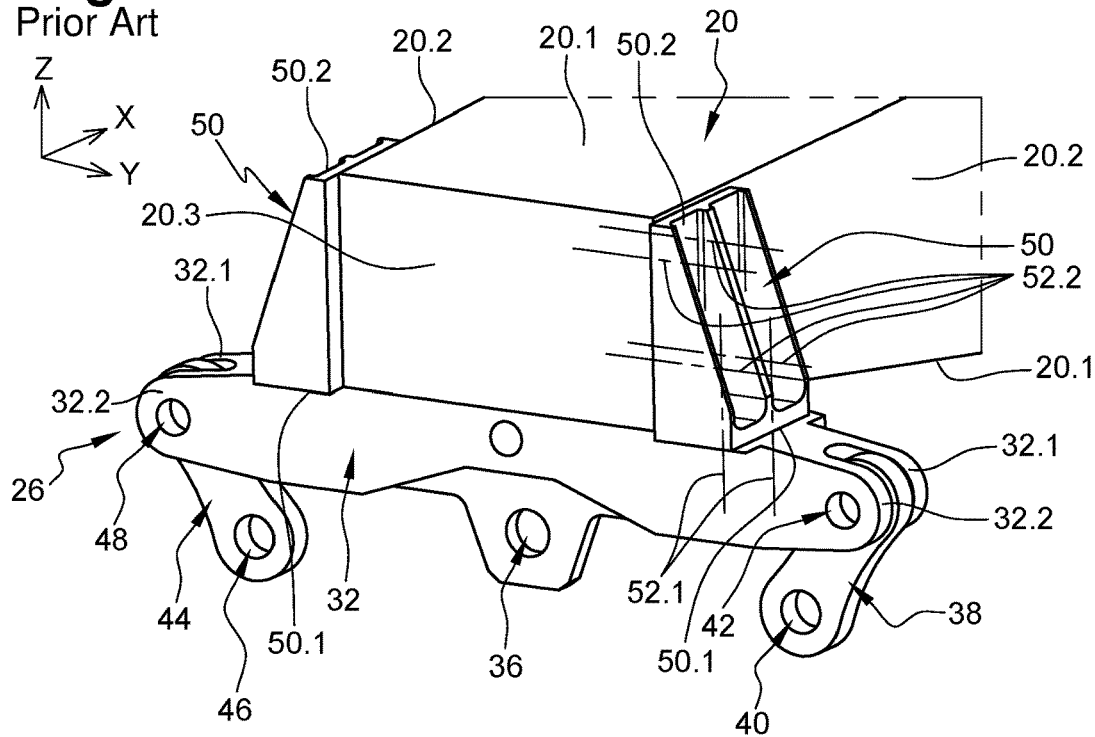
FIG. 3 shows a perspective view of a front engine mount illustrating an embodiment of the prior art.
Figure 4:
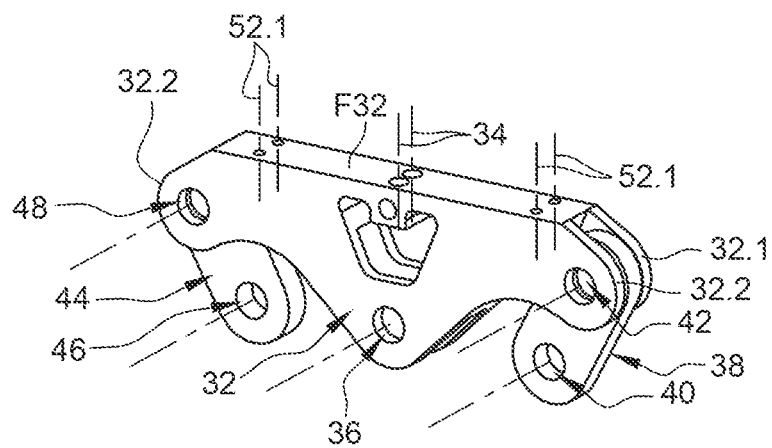
FIG. 4 shows a perspective view of a transverse beam of the front engine mount which can be seen in FIG. 3.
Figure 5:
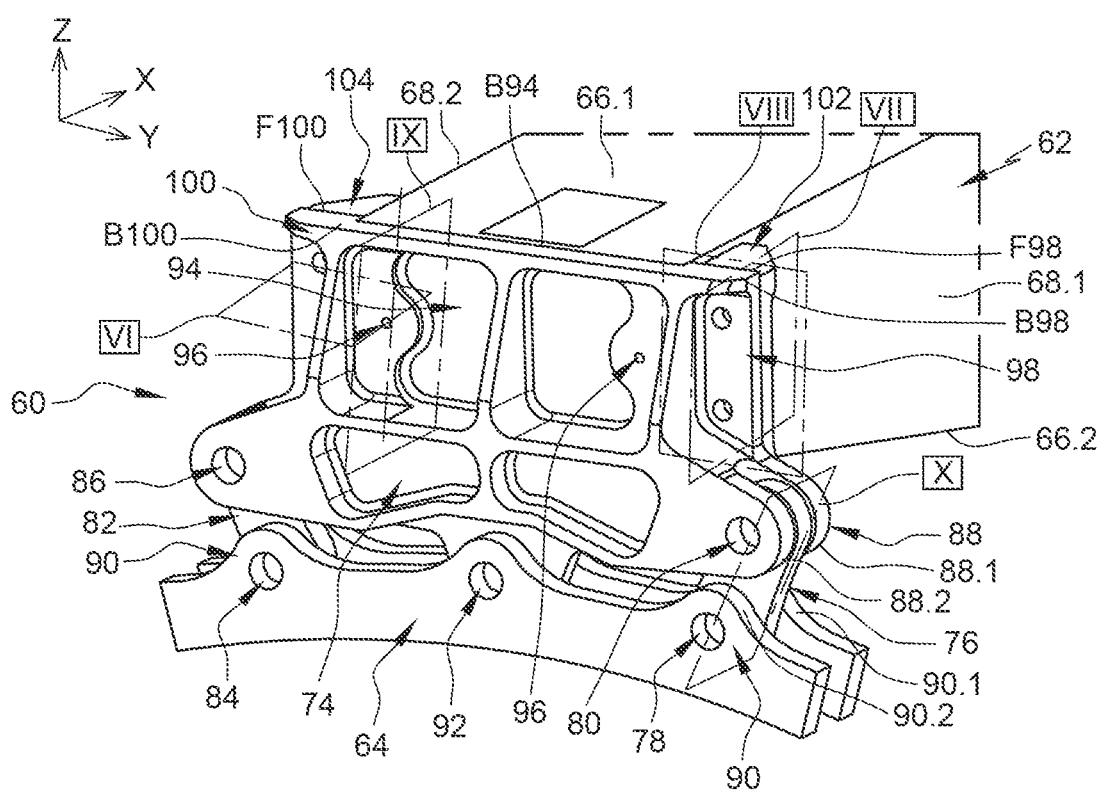
FIG. 5 shows a perspective view of a front engine mount illustrating an embodiment of the invention.
Figure 6:
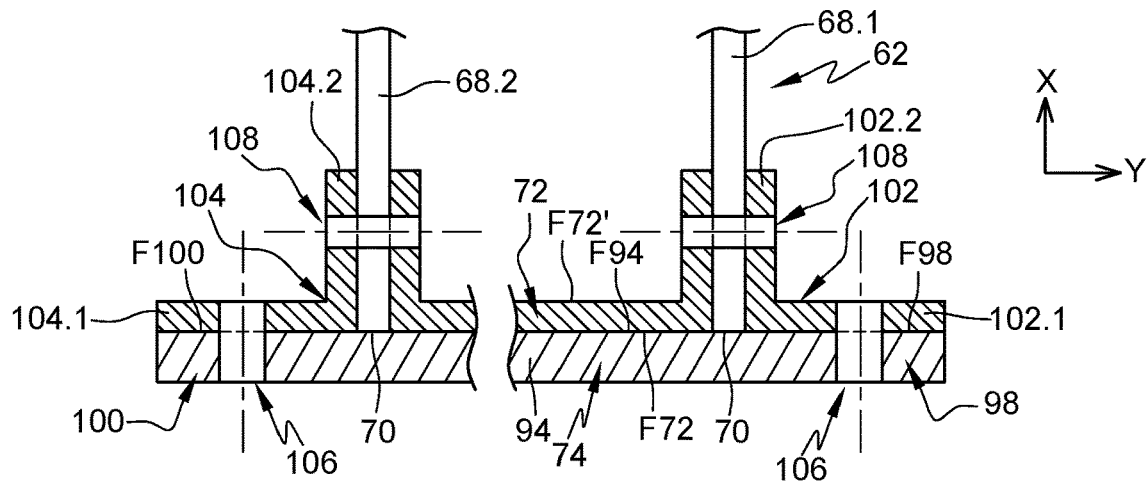
FIG. 6 shows a section along the plane VI of the front engine mount which can be seen in FIG. 5.

According to an embodiment which can be seen in FIG. 5, the primary structure 62 comprises upper and lower side members 66.1, 66.2 and right and left lateral panels 68.1, 68.2. These upper and lower side members 66.1, 66.2 and these right and left lateral panels 68.1, 68.2 comprise front transverse edges 70 which are positioned in a transverse plane, delimiting an opening at the front of the primary structure 62.

In order to obtain a closed box-like structure, the primary structure 62 comprises a front transverse reinforcement 72 which connects the upper and lower side members 66.1, 66.2 and the right and left lateral panels 68.1, 68.2. This front transverse reinforcement 72 has a front face F72 which is orientated toward the front and a rear face F72' which is orientated toward the rear.

According to a first configuration, the front face F72 of the front transverse reinforcement 72 is positioned approximately in the same transverse plane as the front transverse edges 70 of the upper and lower side members 66.1, 66.2 and right and left lateral panels 68.1, 68.2.

According to a second configuration, the front face F72 of the front transverse reinforcement 72 is offset toward the front relative to the transverse plane of the front transverse edges 70 of the upper and lower side members 66.1, 66.2 and right and left lateral panels 68.1, 68.2. According to this second configuration, the transverse reinforcement 72 may comprise an edge which is pressed against the front transverse edges 70.

The front engine mount 60 also comprises:
a transverse beam 74 which is connected to the primary structure 62,
a first connection rod 76 which is connected to the engine 64 by means of at least one first engine connection axle 78 and to the transverse beam 74 by means of at least one first beam connection axle 80,
a second connection rod 82 which is connected to the engine 64 by means of at least one second engine connection axle 84 and to the transverse beam 74 by means of at least one second beam connection axle 86.

Figure 10:
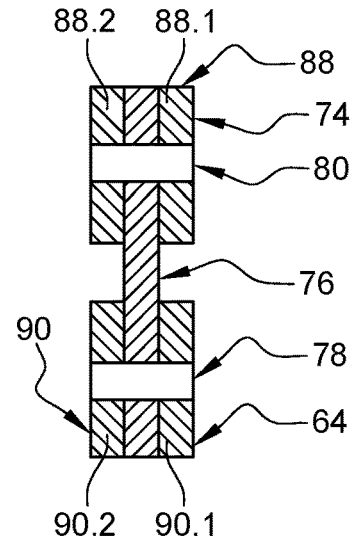
FIG. 10 shows a section taken along the plane X of the front engine mount which can be seen in FIG. 5.

As illustrated in FIG. 10, for each beam connection axle 80, 86, the transverse beam 74 comprises a cover 88 which has two wings 88.1, 88.2 between which the first or second connection rod 76, 82 is positioned.

For each engine connection axle 78, 84, the engine 64 comprises a cover 90 which has two wings 90.1, 90.2 between which the first or second connection rod 76, 82 is positioned. According to one embodiment, at least one engine connection axle 78, 84 and/or at least one beam connection axle 80, 86 comprises a ball joint.

According to an arrangement, the covers 88 and 90 of the transverse beam 74 and the engine 64 are positioned so that the first and second connection rods 76, 82 are convergent in the direction of a location which is positioned below the transverse beam 74 and which is close to the rotation axis of the engine 64. In other words, the line which connects the two centers of the first connection rod 76 (the beam connection axle 80 and the engine connection axle 78 extending through the centers of the first connection rod 76, respectively) intersects with the line which connects the two centers of the second connection rod 82 (the beam connection axle 86 and the engine connection axle 84 extending through the centers of the second connection rod 82), respectively, at a location which is positioned below the transverse beam 84 and which is close to the rotation axis of the engine 64.

According to one configuration, the front engine mount 60 comprises a safety connection axle 92 which directly connects the transverse beam 74 and the engine 64.

This safety connection axle 92, the engine or beam connection axles 78, 80, 84, 86, the first and second connection rods 76, 82 and the various covers 88, 90 are not described in greater detail since they may be identical to those of the prior art.

According to a feature of the invention, the transverse beam 74 comprises an upper extension 94 which is at least partially positioned opposite the front transverse reinforcement 72 and which is connected thereto by means of at least one first connection element 96. Each first connection element 96 comprises a rod which has an approximately horizontal axis which is parallel with the longitudinal direction X. The upper extension 94 is in the form of a plate which is positioned approximately in a transverse plane.

The fact that the transverse beam 74 is partially positioned opposite the front transverse reinforcement 72 of the primary structure 62 enables the spatial requirement of the front engine mount to be reduced in the vertical transverse direction Z.

According to one embodiment, the upper extension 94 has an upper edge B94 which is positioned approximately at the same level as the front transverse edge 70 of the upper side member 66.1 of the primary structure 62.

The term "partially positioned opposite the front transverse reinforcement 72" is intended to be understood to mean that the upper edge B94 is positioned above the front transverse edge 70 of the lower side member 66.2 of the primary structure 62.

The term "approximately horizontal" is intended to be understood to mean that each first connection element has an axis which forms with a horizontal direction an angle of +/−10°.

The term "approximately at the same level" is intended to be understood to mean that the upper edge B94 is positioned at the same height as the front transverse edge 70 of the upper side member 66.1 of the primary structure 62 to within +/−2 cm.

According to a first configuration, the upper extension 94 of the transverse beam 74 has an abutment face F94 which is pressed against the front transverse reinforcement 72 and/or the front transverse edges 70 of the upper and lower side members 66.1, 66.2 and the right and left lateral panels 68.1, 68.2.

According to a second configuration, the front engine mount 60 comprises a spacer wedge which is positioned between the abutment face F94 of the upper extension 94 of the transverse beam 74 and the front transverse reinforcement 72 and/or the front transverse edges 70 of the upper and lower side members 66.1, 66.2 and the right and left lateral panels 68.1, 68.2. According to an arrangement, the front engine mount 60 comprises several first connection elements 96 which are positioned in a symmetrical manner with respect to the longitudinal center plane.

According to one embodiment, the transverse beam 74 comprises right and left lateral extensions 98, 100 which are positioned at one side and the other of the upper extension 94. Each right or left lateral extension 98, 100 is in the form of a plate which is positioned approximately in a transverse plane.

These right and left lateral extensions have abutment faces F98, F100 which are coplanar with the abutment face F94 of the upper extension 94 and which are positioned approximately in a transverse plane. According to one embodiment, the right and left lateral extensions 98, 100 have upper edges B98, B100 which are aligned with the upper edge B94 of the upper extension 94.

In addition, the front engine mount 60 comprises right and left brackets 102, 104 which are positioned at one side and the other of the primary structure 62, the right bracket 102 having a first wing 102.1 which is connected to the right lateral extension 98 and a second wing 102.2 which is connected to the primary structure 62, the left bracket 104 having a first wing 104.1 which is connected to the left lateral extension 100 and a second wing 104.2 which is connected to the primary structure 62.

According to one configuration, the first wing 102.1, 104.1 of each right or left bracket 102, 104 has an abutment surface which is pressed against the abutment face F98, F100 of the right or left lateral extension 98, 100. In contrast to the prior art, the first wing 102.1, 104.1 of each right or left bracket 102, 104 is not positioned in a horizontal plane, but instead in a substantially vertical one, approximately parallel with a transverse plane.

Figure 7:
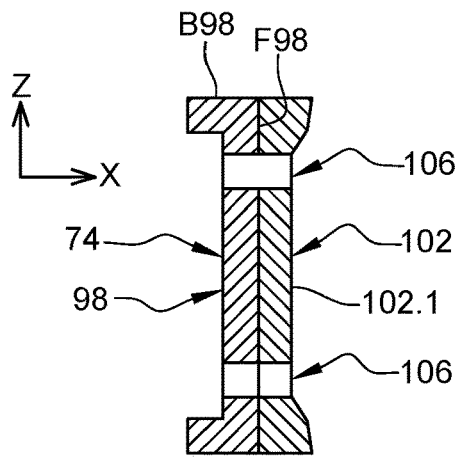
FIG. 7 shows a section along the plane VII of the front engine mount which can be seen in FIG. 5.

The first wing 102.1, 104.1 of each right or left bracket 102, 104 is connected to the right or left lateral extension 98, 100 by means of adhesive bonding, by means of welding or by means of at least one second connection element 106 which extends through the first wing 102.1, 104.1 and the right or left lateral extension 98, 100, as illustrated in FIG. 7. Each second connection element 106 has a rod which has an approximately horizontal axis.

Of course, the invention is not limited to these embodiments for the connection between the first wing 102.1, 104.1 and the right or left lateral extension 98, 100.

According to one embodiment, the first wing 102.1, 104.1 of each right or left bracket 102, 104 has a height (dimension taken in the vertical transverse direction Z) which is substantially equal to that of the right or left lateral extension 98, 100. The connection between the first wing 102.1, 104.1 of each right or left bracket 102, 104 and the right or left lateral extension 98, 100 comprises a plurality of second connection elements 106 which are distributed over the height of the first wing 102.1, 104.1 of each right or left bracket 102, 104.

Figure 8:
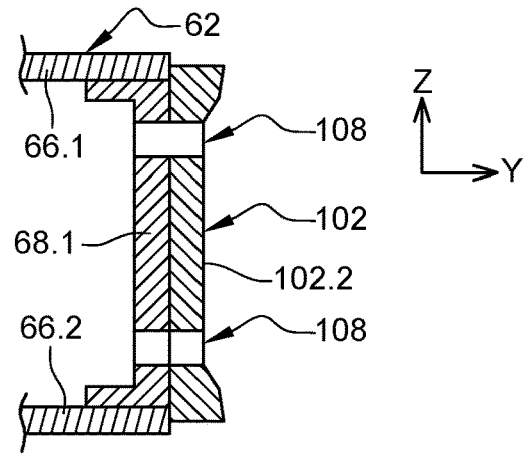
FIG. 8 shows a section taken along the plane VIII of the front engine mount which can be seen in FIG. 5.
Figure 9:
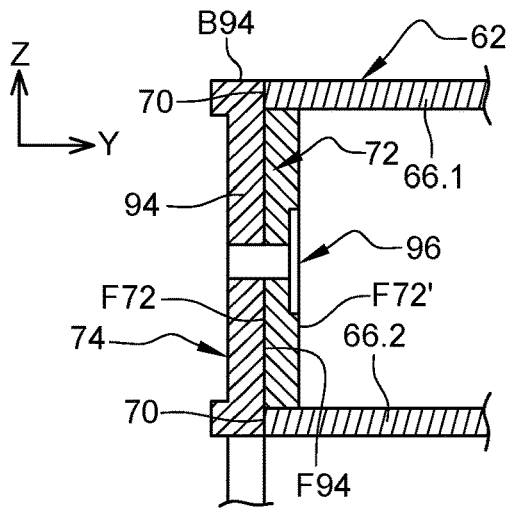
FIG. 9 shows a section taken along the plane IX of the front engine mount which can be seen in FIG. 5.

According to one configuration, the second wing 102.2, 104.2 of each right or left bracket 102, 104 has an abutment surface which is pressed against the right or left lateral panel 68.1, 68.2 of the primary structure 62. The second wing 102.2, 104.2 of each right or left bracket 102, 104 is connected to the primary structure 62 by means of adhesive bonding, by means of welding or by means of at least one third connection element 108 which extends through the second wing 102.2, 104.2 and the right or left lateral panel 68.1, 68.2 of the primary structure 62, as illustrated in FIG. 8. Each third connection element 108 has a rod having an approximately horizontal axis.

Of course, the invention is not limited to these embodiments for the connection between the second wing 102.2, 104.2 of each right or left bracket 102, 104 and the primary structure 62.

According to one embodiment, the second wing 102.2, 104.2 of each right or left bracket 102, 104 has a height (dimension taken in the vertical transverse direction Z) which is substantially equal to that of the portion of the primary structure 62 in the region of which the right or left bracket 102, 104 is positioned. The connection between the second wing 102.2, 104.2 of each right or left bracket 102, 104 and the primary structure 62 comprises several third connection elements 108 which are distributed over the height of the second wing 102.2 104.2 of each right or left bracket 102, 104.

According to an operating method, prior to the assembly of the engine 64, the transverse beam 74 and the right and left brackets 102, 104 are connected to the primary structure 62 using first, second and third connection elements 96, 106 and 108.

The first and second connection rods 76, 82 are connected to the engine 64 or to the transverse beam 74 then the engine 64 is connected to the strut of the aircraft using the first and second engine or beam connection axles 78, 80, 84, 86.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft propulsion assembly comprising:
an engine,
a primary structure of a strut, and
a front engine mount which connects the primary structure and the engine;
the primary structure comprising upper and lower side members, right and left lateral panels and a front transverse reinforcement, the upper and lower side members and the right and left lateral panels comprising front transverse edges;
the front engine mount comprising:
a transverse beam which is connected to the primary structure,
a first connection rod which is connected to the engine with at least one first engine connection axle and to the transverse beam with at least one first beam connection axle,
a second connection rod which is connected to the engine with at least one second engine connection axle and to the transverse beam with at least one second beam connection axle, the first and second connection rods converging in a direction of a location which is positioned below the transverse beam,
right and left brackets which are positioned at one side and the other of the primary structure and which each have a first wing which is connected to the transverse beam and a second wing which is connected to the primary structure,
wherein the transverse beam comprises an upper extension which is at least partially positioned opposite the front transverse reinforcement, at least one first connection element which connects the upper extension and the front transverse reinforcement, right and left lateral extensions which are positioned approximately in a transverse plane at one side and the other of the upper extension and, for each right or left lateral extension, at least one second connection element which connects the right or left lateral extension and the first wing of the right or left bracket which is positioned approximately in said transverse plane, and at least one third connection element connecting the second wing of the right or left bracket to the primary structure by passing through the second wing, the left or right lateral panel, and the front transverse reinforcement such that the left or right lateral panel is between the second wing and the front transverse reinforcement.

2. The aircraft propulsion assembly as claimed in claim 1, wherein the front engine mount comprises a plurality of the first connection elements which are positioned in a symmetrical manner with respect to a longitudinal center plane.

3. The aircraft propulsion assembly as claimed in claim 1, wherein each first connection element comprises a rod which has an approximately horizontal axis.

4. The aircraft propulsion assembly as claimed in claim 1, wherein the upper extension has an upper edge which is positioned approximately at the same level as the front transverse edge of the upper side member of the primary structure.

5. The aircraft propulsion assembly as claimed in claim 1, wherein the upper extension and the right and left lateral extensions have aligned upper edges.

6. The aircraft propulsion assembly as claimed in claim 1, wherein the upper extension and the right and left lateral extensions have coplanar abutment faces.

7. The aircraft propulsion assembly as claimed in claim 1, wherein the first wing of each right or left bracket has a height which is substantially equal to that of the right or left lateral extension to which it is connected, and wherein the front engine mount comprises a plurality of the second connection elements which are distributed over the height of the first wing of each right or left bracket.

8. The aircraft propulsion assembly as claimed in claim 1, wherein the second wing of each right or left bracket has a height which is substantially equal to that of a portion of the primary structure in a region of which the right or left bracket is positioned, and wherein the front engine mount comprises a plurality of third connection elements of the at least one third connection element which connect the second wing of each right or left bracket and the primary structure, said plurality of third connection elements being distributed over the height of the second wing of each right or left bracket.

9. An aircraft comprising at least one propulsion assembly as claimed in claim 1.

\* \* \* \* \*